(12) United States Patent
Yoshida

(10) Patent No.: US 6,431,307 B2
(45) Date of Patent: Aug. 13, 2002

(54) ELECTRIC POWER STEERING CONTROL SYSTEM

(75) Inventor: Kazuyuki Yoshida, Kashihara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/802,874

(22) Filed: Mar. 12, 2001

(30) Foreign Application Priority Data

Mar. 15, 2000 (JP) .................................... 2000-072546

(51) Int. Cl.$^7$ ................................................ B62D 5/04
(52) U.S. Cl. ...................................... 180/446; 701/42
(58) Field of Search ........................... 180/443, 446; 701/41–42

(56) References Cited

U.S. PATENT DOCUMENTS

| | | | | |
|---|---|---|---|---|
| 4,574,903 A | * | 3/1986 | Hashimoto et al. | 180/446 |
| 4,624,334 A | * | 11/1986 | Kelledes et al. | 180/446 |
| 4,651,840 A | * | 3/1987 | Shimizu et al. | 180/446 |
| 4,681,181 A | * | 7/1987 | Shimizu | 180/446 |
| 4,715,461 A | * | 12/1987 | Shimizu | 180/446 |
| 4,727,950 A | * | 3/1988 | Shimizu et al. | 180/446 |
| 4,874,053 A | * | 10/1989 | Kimura et al. | 180/446 |
| 4,895,216 A | * | 1/1990 | Fusimi et al. | 180/446 |
| 5,285,390 A | * | 2/1994 | Haseda et al. | 180/446 |
| 5,343,393 A | * | 8/1994 | Hirano et al. | 180/446 |
| 5,878,360 A | * | 3/1999 | Nishino et al. | 180/446 |
| 6,016,881 A | * | 1/2000 | Sakai et al. | 180/446 |

\* cited by examiner

Primary Examiner—Avraham Lerner
Assistant Examiner—Matt Luby
(74) Attorney, Agent, or Firm—Rabin & Berdo, P.C.

(57) ABSTRACT

A control system for an electric power steering system which generates a steering assist force by an electric motor driven on the basis of a steering torque applied to an operation member. The control system includes: a target current determining circuit for generating a target current value according to the steering torque; a compensation value determining circuit for generating a compensation current value according to a time-based differential value of the steering torque; a waveform transforming circuit for performing a waveform transformation to convert the compensation current value into a modified compensation value which sinusoidally changes with time; a circuit for generating a control command value by superimposing the modified compensation value obtained through the waveform transformation on the target current value; and a motor driving circuit for driving the electric motor on the basis of the control command value.

6 Claims, 4 Drawing Sheets

PRIOR ART

I

ΔI

I+ΔI'

ELECTRIC POWER STEERING CONTROL SYSTEM

BACKGROUND OF THE INVENTION

1. Field of the Invention

The present invention relates to an electric power steering system which assists a steering operation by driving an electric motor according to a steering torque and transmitting a driving force generated by the electric motor to a steering mechanism. The invention further relates to a control system for such an electric power steering system.

2. Description of Related Art

In an electric power steering system for assisting a steering operation by utilizing a driving force generated by an electric motor, the electric motor is driven on the basis of a steering torque applied to a steering wheel, and the driving force generated by the electric motor is transmitted to a steering mechanism.

The electrical construction of a prior art electric power steering system is shown in FIG. 3. The electric power steering system controls an electric motor 58 for applying a steering assist force to a steering mechanism by a controller 50 comprised of a microcomputer. An output signal of a torque sensor 57 for detecting a steering torque applied to a steering wheel is inputted to the controller 50. The analog signal outputted from the torque sensor 57 is converted into a digital signal by an analog/digital (A/D) convertor 51. The controller 50 determines a control command value corresponding to an electric current to be applied to the electric motor 58 on the basis of the steering torque T in a digital form, and drives the electric motor 58 via a motor driving circuit 55 on the basis of the control command value.

The controller 50 is adapted to perform every computation therein on a digital basis. That is, the controller 50 performs software-based computations according to predetermined operation programs, thereby functioning as an assist controlling section 52, an inertia compensating section 53 and an adder section 54.

The assist controlling section 52 determines a target current value I according to the steering torque T. The inertia compensating section 53 outputs a compensation current value ΔI according to a time-based differential value ΔT of the steering torque T. The compensation current value ΔI is an electric current value for compensating for a response delay occurring due to the inertia of the steering mechanism and the electric motor 58. The adder section 54 adds the compensation current value ΔI from the inertia compensating section 53 to the target current value I from the assist controlling section 52 to provide the control command value I+ΔI. The motor driving circuit 55 is controlled on the basis of the control command value I+ΔI, whereby the electric motor 58 generates the steering assist force according to the steering torque T with a satisfactory responsiveness.

FIG. 4 is a diagram showing a relationship between the time-based differential value ΔT of the steering torque T and the compensation current value ΔI. The inertia compensating section 53 outputs the compensation current value ΔI which is, for example, proportional to the time-based differential value ΔT of the steering torque T. However, all the computations to be performed in the controller 50 are program-based digital computations, so that the time-based differential value ΔT is merely a discrete value on a one-bit basis and, hence, the compensation current value ΔI is also a discrete value. Therefore, the compensation current value ΔI changes stepwise with respect to the time-based differential value ΔT.

Where the steering torque T changes sufficiently rapidly, the electric motor 58 can properly be controlled even if the compensation current value ΔI changes stepwise with respect to the time-based differential value ΔT. Where the steering torque T changes very slowly with time, on the contrary, the target current value I outputted from the assist controlling section 52 changes stepwise by a very small amount in a longer cycle as shown in FIG. 5A. Accordingly, a pulse indicative of the compensation current value ΔI is generated for a time-based differential value of ΔT=1 bit in a relatively long cycle, as shown in FIG. 5B, by the inertia compensating section 53. In this case, the control command value I+ΔI obtained by the addition of the target current value I and the compensation current value ΔI in the adder section 54 appears as a pulse in a pulsed waveform in a relatively long cycle as shown in FIG. 5C. When a pulsed electric current is applied to the electric motor 58 according to the control command value, resonance occurs between the electric motor 58 and the steering mechanism, resulting in uncomfortable vibrations and noises.

SUMMARY OF THE INVENTION

It is therefore an object of the present invention to provide an electric power steering control system which can effectively suppress the vibrations and the noises.

It is another object of the present invention to provide an electric power steering system which can effectively suppress the vibrations and the noises.

The electric power steering control system according to the present invention is a control system for an electric power steering system which is adapted to generate a steering assist force by an electric motor driven on the basis of a steering torque applied to an operation member, and comprises: a target current determining circuit for generating a target current value according to the steering torque; a compensation value determining circuit for generating a compensation current value according to a time-based differential value of the steering torque; a waveform transforming circuit for performing a waveform transformation to convert the compensation current value generated by the compensation value determining circuit into a modified compensation value which sinusoidally changes with time; a circuit for generating a control command value by superimposing the modified compensation value generated by the waveform transforming circuit on the target current value determined by the target current determining circuit; and a motor driving circuit for driving the electric motor on the basis of the control command value.

With this arrangement, the compensation current value is generated according to the time-based differential value of the steering torque, and then subjected to the waveform transformation thereby to be converted into the modified compensation value which sinusoidally changes with time. Then, the modified compensation value obtained through the waveform transformation is superimposed on the target current value determined according to the steering torque for the generation of the control command value. Even if the steering torque changes slowly with time so that the compensation current value changes in a pulse form, the control command value does not change in a pulse form but gradually sinusoidally changes. Therefore, uncomfortable vibrations and noises of the electric motor or the steering mechanism can be prevented by controlling the driving of the electric motor on the basis of the control command value.

The present invention is particularly advantageous where the target current determining circuit, the compensation value determining circuit and the like are adapted to determine the target current value and the compensation current value in a digital data form on the basis of the steering torque in a digital data form.

The target current determining circuit, the compensation value determining circuit, the waveform transforming circuit and the like may perform their functions on a software basis by causing a microcomputer to execute predetermined programs.

The foregoing and other objects, features and effects of the present invention will become more apparent from the following description of the preferred embodiments with reference to the attached drawings.

DESCRIPTION OF THE PREFERRED EMBODIMENTS

Figure 1:
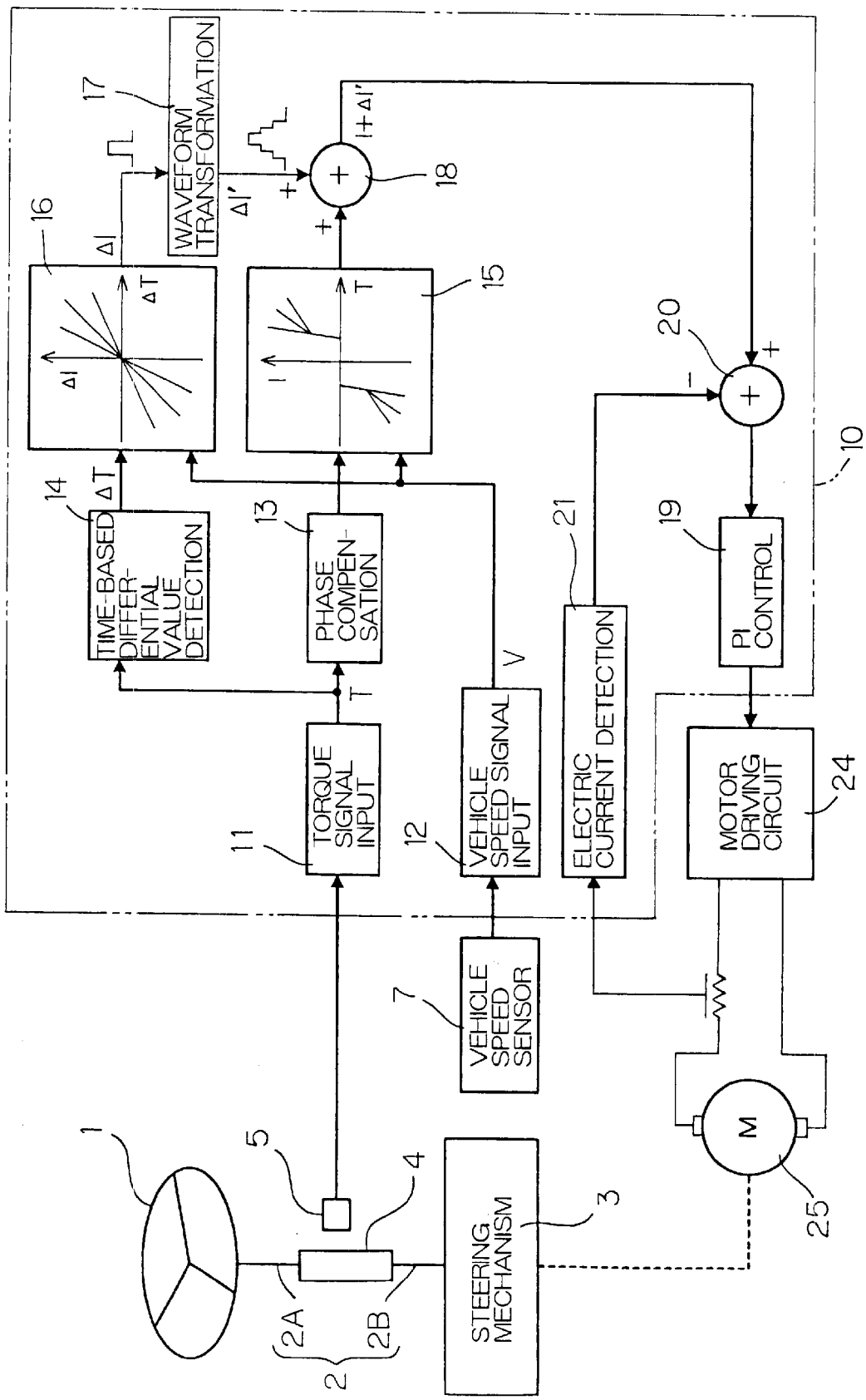
FIG. 1 is a block diagram for explaining the electrical construction of an electric power steering system according to one embodiment of the present invention.

FIG. 1 is a block diagram illustrating the electrical construction of an electric power steering system according to one embodiment of the present invention. A steering torque applied to a steering wheel 1 as an operation member is transmitted to a steering mechanism 3 via a steering shaft 2. A driving force of an electric motor 25 is transmitted as a steering assist force to the steering mechanism 3.

The steering shaft 2 is divided into an input shaft 2A coupled to the side of the steering wheel 1 and an output shaft 2B coupled to the side of the steering mechanism 3. The input shaft 2A and the output shaft 2B are coupled to each other by a torsion bar 4. The torsion bar 4 experiences a torsion according to a steering torque T, and the direction and magnitude of the torsion are detected by a torque sensor 5. An output signal of the torque sensor 5 is inputted to a controller 10 (ECU: electronic control unit) comprised of a microcomputer.

The controller 10 applies a driving electric current to the electric motor 25 according to the steering torque T detected by the torque sensor 5 to control the driving of the electric motor 25 so as to apply the steering assist force to the steering mechanism 3 according to the steering torque T. The controller 10 receives an output signal of a vehicle speed sensor 7 for detecting the speed V of a motor vehicle equipped with the inventive electric power steering system in addition to the output signal of the torque sensor 5.

The controller 10 includes a torque signal inputting circuit 11 and a vehicle speed signal inputting circuit 12 for processing the output signals of the torque sensor 5 and the vehicle speed sensor 7. The torque signal inputting circuit 11 and the vehicle speed signal inputting circuit 12 each have an analog/digital converting circuit so as to output the steering torque T and the vehicle speed V in a digital data form.

The controller 10 has a plurality of functional processing sections which are implemented by executing operation programs stored in a storage medium (e.g., ROM) not shown. These functional processing sections include a phase compensating section 13 for advancing the phase of a signal of the steering torque T for stabilization of the system, an assist controlling section 15 for generating a target current value I according to the steering torque T subjected to the phase advancing process by the phase compensating section 13, a time-based differential value detecting section 14 for detecting a time-based differential value $\Delta T$ of the steering torque T, an inertia compensating section 16 for generating a compensation current value $\Delta I$ according to the time-based differential value $\Delta T$ determined by the time-based differential value detecting section 14, and a waveform transforming section 17 for performing a waveform transformation to convert the compensation current value $\Delta I$ outputted in a pulse form by the inertia compensating section 16 into a modified compensation value $\Delta I'$ which sinusoidally changes with time.

An adder section 18 adds the modified compensation value $\Delta I'$ generated by the waveform transforming section 17 to the target current value I generated by the assist controlling section 15 to generate a control command value $I+\Delta I'$. The control command value $I+\Delta I'$ is applied to a subtractor section 20.

The subtractor section 20 determines a difference between a motor current value detected by an electric current detecting circuit 21 and the control command value $I+\Delta I'$. The difference thus determined is inputted to a PI controlling section 19. The PI controlling section 19 determines the value of a voltage to be applied to the electric motor 25 through a proportional-plus-integral control computation. A motor driving circuit 24 for driving the electric motor 25 is controlled on the basis of the voltage value.

An electric current flowing through the electric motor 25 is led to a level corresponding to the control command value $I+\Delta I'$ through feedback of the motor current value by the electric current detecting circuit 21. Thus, the steering assist force according to the steering torque T is transmitted to the steering mechanism 3.

The inertia compensating section 16 compensates for a response delay which is attributable to the inertia of the electric motor 25 and the steering mechanism 3. The inertia compensating section 16 generates the compensation current value $\Delta I$ which is proportional to the time-based differential value $\Delta T$ of the steering torque T. The compensation current value $\Delta I$ is, for example, stored in a memory (not shown) within the controller 10 in table form in connection with the time-based differential value $\Delta T$ of the steering torque.

The time-based differential value $\Delta T$ is expressed by a digital value and, hence, is merely a discrete value on a one-bit basis. Similarly, the compensation current value $\Delta I$ stored in the table is expressed by digital data and, hence, is merely a discrete value which changes stepwise with respect to the time-based differential value $\Delta T$.

A plurality of tables each storing the compensation current value $\Delta I$ are provided, for example, for a plurality of vehicle speed ranges. Thus, the compensation current value $\Delta I$ is set smaller as the vehicle speed V increases, whereby the compensation of the inertia can be suppressed during high speed traveling.

The assist controlling section 15 generates the target current value I which changes according to the steering torque T. The target current value I is, for example, stored in a memory not shown in table form in connection with the steering torque T. A plurality of tables for the target current value I are provided, for example, for a plurality of vehicle speed ranges. Thus, the target current value I is set smaller as the vehicle speed V increases, whereby a so-call vehicle speed sensitive control can be achieved.

Figures 2A, 2B, 2C, 2D:
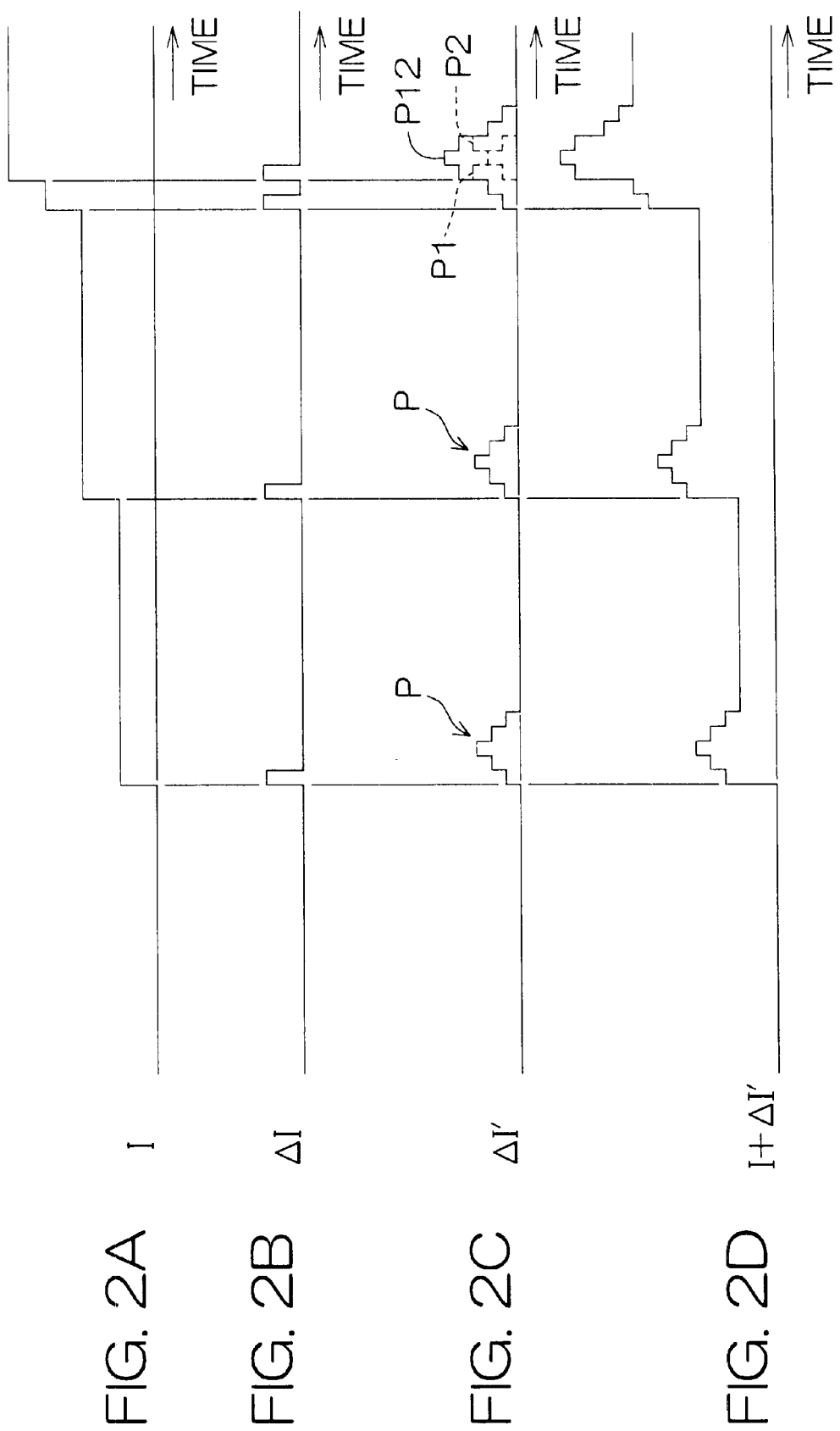
FIGS. 2A to 2D are wave form diagrams for explaining the function of a waveform transforming section which converts a compensation current value changing in a pulse form into a modified compensation value sinusoidally changing with time.
Figure 3:
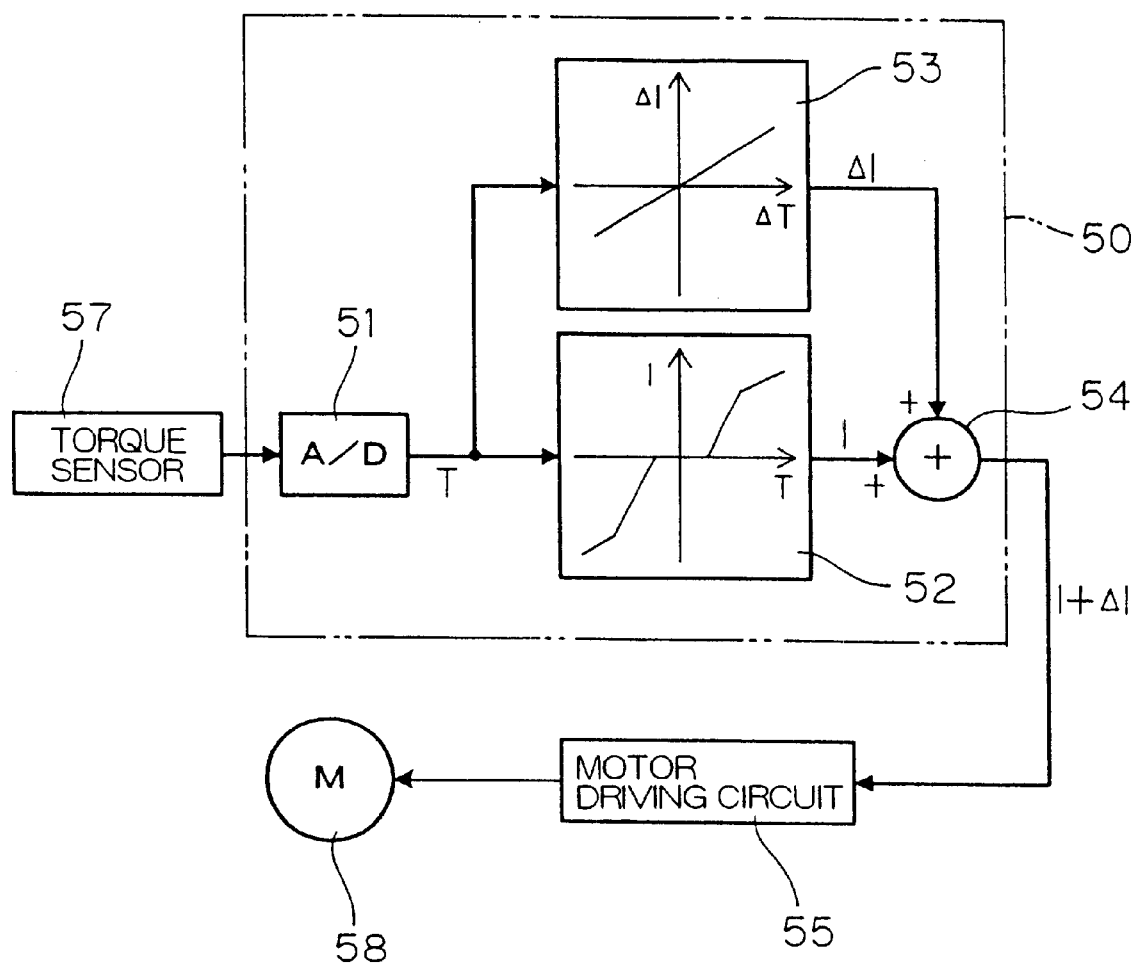
FIG. 3 is a block diagram illustrating the electrical construction of major portions of a prior art electric power steering system.
Figure 4:
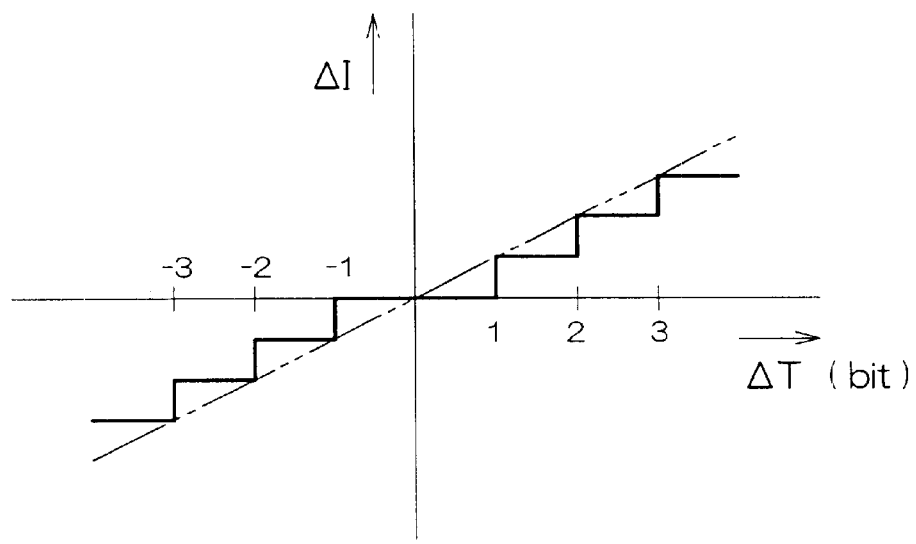
FIG. 4 is a diagram showing a change in a compensation current value with respect to a time-based differential value of a steering torque.
Figure 5A:
FIGS. 5A to 5C are waveform diagrams showing time-related charges in a target current value, the compensation current value and a control command value occurring when the steering torque slowly changes with time.
Figure 5B:
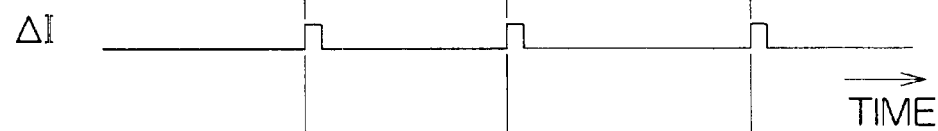
Figure 5C:
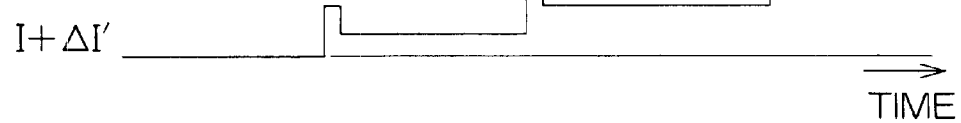

FIGS. 2A to 2D are waveform diagrams for explaining the function of the waveform transforming section 17. FIG. 2A illustrates a time-related change in the target current value I generated by the assist controlling section 15, and FIG. 2B illustrates a time-related change in the compensation current value ΔI generated by the inertia compensating section 16. FIG. 2C illustrates a time-related change in the modified compensation value ΔI' generated by the waveform transforming section 17, and FIG. 2D illustrates a time-related change in the control command value I+ΔI' generated by the adder section 18.

FIGS. 2A to 2D show a case where the steering torque T changes very slowly with time. In this case, the steering torque T in a digital data form changes stepwise in a relatively long cycle, so that the target current value I in a digital data form correspondingly changes stepwise. At this time, the inertia compensating section 16 generates the compensation current value ΔI as a pulse for a one-bit change (ΔT=1 bit) of the steering torque T in a relatively long cycle.

The waveform transforming section 17 converts the compensation current value ΔI applied in a pulse form from the inertia compensating section 16 into the modified compensation value ΔI' which sinusoidally changes with time as shown in FIG. 2C. However, the function of the waveform transforming section 17 is effected through the digital computation, so that the modified compensation value ΔI' does not change in a smooth sinusoidal waveform but in a stepwise sinusoidal waveform with small steps as shown by a reference character P in FIG. 2C. In the case shown in FIG. 2C, four discrete values are employed for the generation of the modified compensation value ΔI' which sinusoidally changes with time.

Where the inertia compensating section 16 generates pulses indicative of a compensation current value ΔI at a short interval, the waveform transforming section 17 superimposes sinusoidal waveforms P1, P2 for the respective pulses to generate the modified compensation value ΔI' which changes in a greater sinusoidal waveform P12.

The control command value I+ΔI' is obtained by superimposing the modified compensation value ΔI' on the target current value I in the adder section 18. Therefore, the waveform of FIG. 2D obtained by superimposing the waveforms of FIGS. 2A and 2C indicates a time-related change in the control command value I+ΔI'.

With the aforesaid construction according to this embodiment, the pulsed change in the compensation current value ΔI generated by the inertia compensating section 16 is converted into the sinusoidal time-related change by the waveform transforming section 17. Then, the control command value I+ΔI' is generated by superimposing the modified compensation value ΔI' gradually changing in the sinusoidal waveform with time on the target current value I, and the electric motor 25 is controlled on the basis of the control command value I+ΔI'. Even if the steering torque T changes very slowly, uncomfortable vibrations and noises can be prevented which may otherwise occur due to resonance between the electric motor 25 and the steering mechanism 3, and the like.

Where the steering torque T changes relatively rapidly, the plurality of sinusoidal waveforms for the pulses indicative of the compensation current value ΔI outputted from the inertia compensating section 16 are superimposed one on another for the generation of the modified compensation value ΔI' which changes in the greater sinusoidal waveform. This eliminates the possibility of a response delay.

While one embodiment of the present invention has thus been described, the invention may be embodied in any other ways. Although the waveform transforming section 17 is adapted to generate the stepwise sinusoidal waveform with four steps in response to the input of the pulse of the compensation current value ΔI (corresponding to the minimum value (1 bit) of ΔT), a stepwise sinusoidal waveform may be generated by employing three discrete values or five or more discrete values.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese patent application no. 2000-72546 filed to the Japanese patent Office on Mar. 15, 2000, the disclosure thereof being incorporated herein by reference.

What is claimed is:

1. A control system for an electric power steering system adapted to generate a steering assist force by an electric motor driven on the basis of a steering torque applied to an operation member, the control system comprising:

a target current determining circuit for generating a target current value according to the steering torque;

a compensation value determining circuit for generating a compensation current value according to a time-based differential value of the steering torque;

a waveform transforming circuit for performing a waveform transformation to convert the compensation current value generated by the compensation value determining circuit into a modified compensation value which sinusoidally changes with time;

a circuit for generating a control command value by superimposing the modified compensation value generated by the waveform transforming circuit on the target current value determined by the target current determining circuit; and a motor driving circuit for driving the electric motor on the basis of the control command value.

2. A control system as set forth in claim 1, wherein the compensation value determining circuit generates the compensation current value in a digital data form on the basis of the time-based differential value of the steering torque in a digital data form.

3. A control system as set forth in claim 1, wherein the waveform transforming circuit performs the waveform transformation so that a pulse indicative of the compensation current value for a minimum value of the time-based differential value of the steering torque is converted into a digital signal having a stepwise sinusoidal waveform expressed by at least three discrete values.

4. An electric power steering system comprising:

an electric motor for generating a steering assist force; and a control system for driving the electric motor on the basis of a steering torque applied to an operation member, the control system comprising:
- a target current determining circuit for generating a target current value according to the steering torque;
- a compensation value determining circuit for generating a compensation current value according to a time-based differential value of the steering torque;
- a waveform transforming circuit for performing a waveform transformation to convert the compensation current value generated by the compensation value determining circuit into a modified compensation value which sinusoidally change with time;
- a circuit for generating a control command value by superimposing the modified compensation value generated by the waveform transforming circuit on the target current value determined by the target current determining circuit; and
- a motor driving circuit for driving the electric motor on the basis of the control command value.

5. An electric power steering system as set forth in claim 4, wherein the compensation value determining circuit generates the compensation current value in a digital data form on the basis of the time-based differential value of the steering torque in a digital data form.

6. An electric power steering system as set forth in claim 4, wherein the waveform transforming circuit performs the waveform transformation so that a pulse indicative of the compensation current value for a minimum value of the time-based differential value of the steering torque is converted into a digital signal having a stepwise sinusoidal waveform expressed by at least three discrete value.

* * * * *